(12) United States Patent
Yoda

(10) Patent No.: US 9,819,543 B2
(45) Date of Patent: Nov. 14, 2017

(54) NON-TRANSITORY COMPUTER READABLE MEDIUM STORING COMMUNICATION PROGRAM FOR SETTING OF A COMMUNICATION PROTOCOL AND COMMUNICATION DEVICE

(71) Applicant: FUJI XEROX CO., LTD., Tokyo (JP)

(72) Inventor: Yoshiyuki Yoda, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 15/221,738

(22) Filed: Jul. 28, 2016

(65) Prior Publication Data

US 2017/0272320 A1 Sep. 21, 2017

(30) Foreign Application Priority Data

Mar. 17, 2016 (JP) .................................. 2016-053419

(51) Int. Cl.
| | | |
|---|---|---|
| G06K 15/00 | (2006.01) | |
| H04L 12/24 | (2006.01) | |
| H04L 12/26 | (2006.01) | |
| H04L 29/14 | (2006.01) | |
| H04N 1/00 | (2006.01) | |
| H04N 1/32 | (2006.01) | |
| H04N 1/327 | (2006.01) | |

(52) U.S. Cl.
CPC ...... *H04L 41/0816* (2013.01); *H04L 43/0823* (2013.01); *H04L 69/40* (2013.01); *H04N 1/00129* (2013.01); *H04N 1/32614* (2013.01); *H04N 1/32625* (2013.01); *H04N 1/32651* (2013.01); *H04N 1/32702* (2013.01); *H04N 2201/0094* (2013.01)

(58) Field of Classification Search
None
See application file for complete search history.

(56) References Cited

U.S. PATENT DOCUMENTS

| | | | | |
|---|---|---|---|---|
| 5,253,079 A | * | 10/1993 | Nakatani | ............ H04N 1/00408 358/3.29 |
| 2006/0158686 A1 | * | 7/2006 | Watanabe | .......... H04N 1/00204 358/1.15 |
| 2012/0212781 A1 | * | 8/2012 | Kohata | ................. G06F 3/1207 358/1.15 |

FOREIGN PATENT DOCUMENTS

JP            10-091550       4/1998

OTHER PUBLICATIONS

Abstract and machine translation of JP 10-091550.

* cited by examiner

*Primary Examiner* — Thomas D Lee
(74) *Attorney, Agent, or Firm* — Fildes & Outland, P.C.

(57) ABSTRACT

A non-transitory computer readable medium stores a communication program for causing a computer to execute a process for performing a function, the process including: verifying, when detected that a type of a target communication device is changed, setting details which are previously prepared by changing setting of a communication protocol based on the setting details which are previously prepared for the type of the target communication device and communicating with the target communication device; and applying the changed setting of the communication protocol when verified that no communication error is detected during the verification.

5 Claims, 7 Drawing Sheets

FIG. 5

113 SETTING INFORMATION

| MANUFACTURER | PROFILE |
|---|---|
| Apple | CHARACTER TYPE SETTING: SJIS (Mac OS SPECIFICATIONS) |
| Other | CHARACTER TYPE SETTING: CP932 (Windows SPECIFICATIONS) |

NON-TRANSITORY COMPUTER READABLE MEDIUM STORING COMMUNICATION PROGRAM FOR SETTING OF A COMMUNICATION PROTOCOL AND COMMUNICATION DEVICE

CROSS-REFERENCE TO RELATED APPLICATIONS

This application is based on and claims priority under 35 USC 119 from Japanese Patent Application No. 2016-053419 filed on Mar. 17, 2016.

BACKGROUND

1. Technical Field

The present invention relates to a non-transitory computer readable medium storing a communication program, and a communication device.

2. Related Art

In the related art, a communication device is proposed, which enables recognition of a document on a reception side even in a case where a character code used on a communication destination system side is different from a character code used in the communication device.

SUMMARY

An aspect of the invention provides a non-transitory computer readable medium storing a communication program for causing a computer to execute a process for performing a function, the process including: verifying, when detected that a type of a target communication device is changed, setting details which are previously prepared by changing setting of a communication protocol based on the setting details which are previously prepared for the type of the target communication device and communicating with the target communication device; and applying the changed setting of the communication protocol when verified that no communication error is detected during the verification.

Another aspect of the invention provides a communication device including: a verification unit that verifies, when detected that a type of a target communication device is changed, setting details which are previously prepared by changing setting of a communication protocol based on the setting details which are previously prepared for the type of the target communication device and communicating with the target communication device; and an application unit that applies the changed setting of the communication protocol when verified that no communication error is detected by the verification unit.

BRIEF DESCRIPTION OF DRAWINGS

Exemplary embodiments of the present invention will be described in detail based on the following figures, wherein:

FIG. 5 is a table illustrating a specific example of a configuration of setting information;

DETAILED DESCRIPTION

Exemplary Embodiment (Configuration of Communication System)

Figure 1:
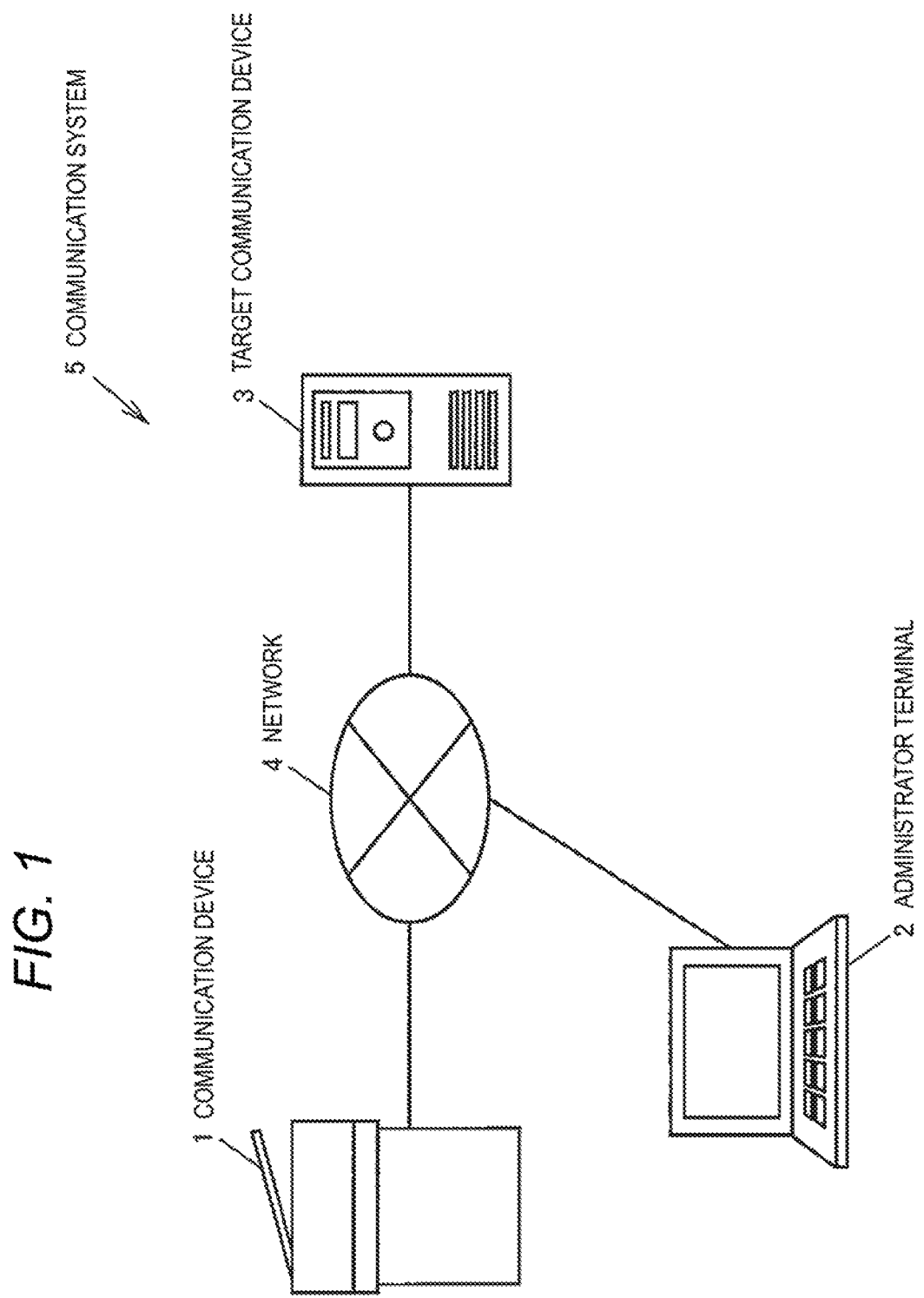
FIG. 1 is a schematic diagram illustrating an example of a configuration of a communication system according to an exemplary embodiment.

FIG. 1 is a schematic diagram illustrating an example of a configuration of a communication system according to an exemplary embodiment.

A communication system 5 has a structure in which a communication device 1, an administrator terminal 2, and a target communication device 3 are connected to each other through a network 4, so as to enable communication with each other.

As an example, the communication device 1 may be a multifunction machine which includes functions of printing, scanning, FAX, and the like, and be a communication device communicating with the target communication device 3 in order to perform the functions. The communication device 1 includes an electronic component such as a central processing unit (CPU) or a flash memory, in the main body. The electronic component has a function of processing information.

The administrator terminal 2 is a communication device such as a personal computer (PC), which is used by an administrator of the communication device 1. The administrator terminal 2 includes an electronic component such as a central processing unit (CPU) or a flash memory, in the main body. The electronic component has a function of processing information.

The target communication device 3 is a device such as a server, which has a communication function. The target communication device 3 includes an electronic component such as a central processing unit (CPU) or a flash memory, in the main body. The electronic component has a function of processing information.

The network 4 is a communication network which allows high-speed communication. For example, the network 4 is a wired or wireless communication network such as an intranet and a local area network (LAN).

As an example, the communication device 1 is set to generate image information by scanning an original document using so-called "Scan to SMB", and to transmit the generated image information to a shared folder which is formed in a memory of the target communication device 3, through the network 4. The target communication device 3 is assumed to be replaced from the target communication device which has been used before. The target communication device 3 is replaced, and thus the communication device 1 verifies communication with the target communication device 3, and attempts to change setting so as to enable correspondence to the target communication device 3, in a situation in which errors such as authentication failure or character corruption occur and the function of "Scan to SMB" of the communication device 1 is not used.

A term of communication setting means designation of not a setting item which is automatically set by transmission and reception between the communication device 1 and the target communication device 3, on a communication protocol, but an item which is not automatically set.

(Configuration of Communication Device)

Figure 2:
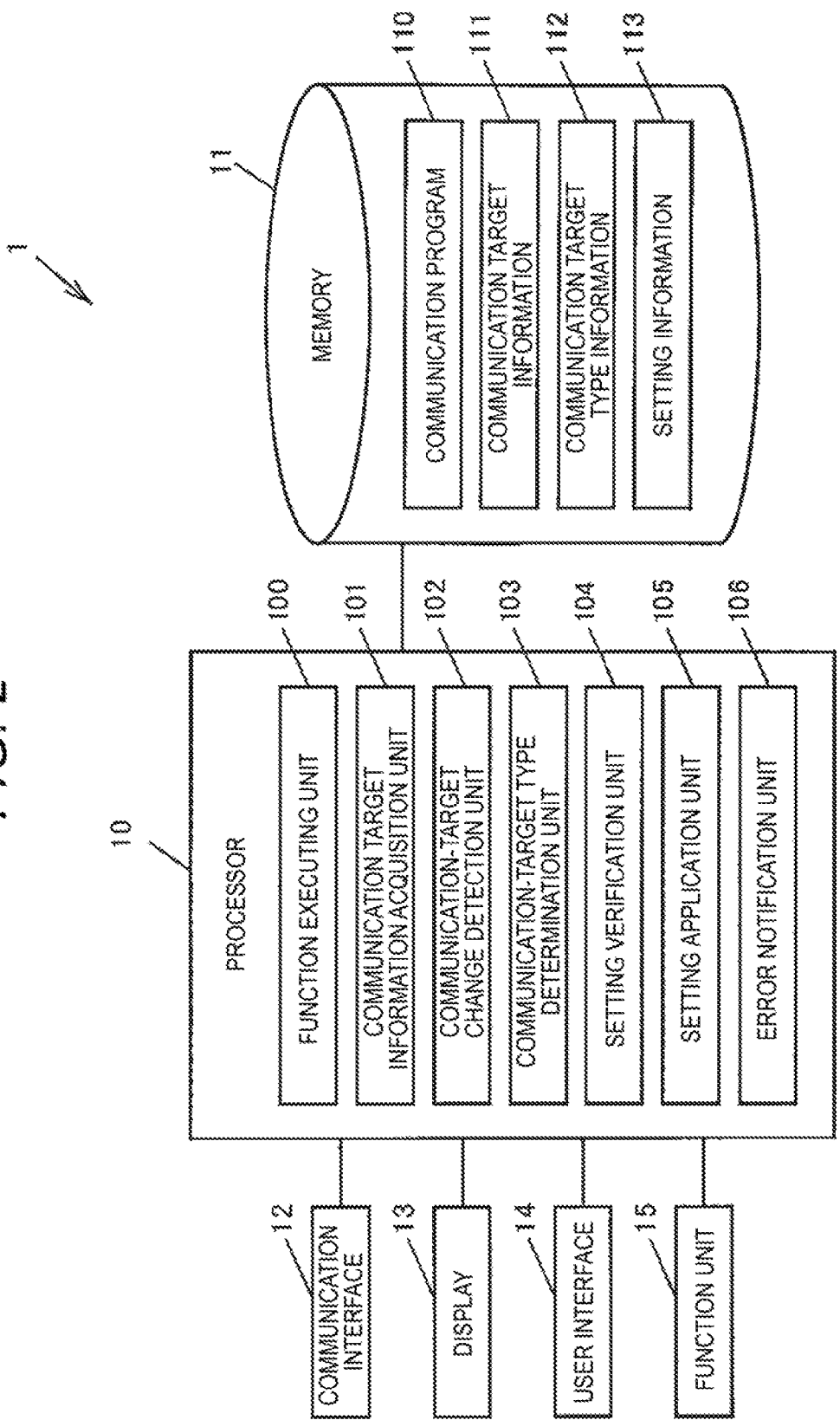
FIG. 2 is a block diagram illustrating a configuration example of a communication device according to the exemplary embodiment.

FIG. 2 is a block diagram illustrating a configuration example of the communication device 1 according to the exemplary embodiment.

The communication device 1 includes a processor 10, a memory 11, a communication interface 12, a display 13, a user interface 14, and a function unit 15. The processor 10 is configured by a CPU and the like. The processor 10 controls other components and executes various programs. The memory 11 is configured by a recording medium such as a flash memory, and stores information. The communication interface 12 performs communication with an external device through a network. The display 13 is configured by a liquid crystal display (LCD) and the like, and displays a character or an image. The user interface 14 is configured by a button, a touchpad, and the like, and receives an input operation. The function unit 15 performs functions of printing, scanning, FAX, and the like.

The processor 10 executes a communication program 110 (which will be described later) so as to execute functions as a function execution unit 100, a communication target information acquisition unit 101, a communication-target change detection unit 102, a communication-target type determination unit 103, a setting verification unit 104, a setting application unit 105, an error notification unit 106, and the like.

The function execution unit 100 causes the function unit 15 to execute a function of printing, scanning, FAX, or the like. The function of "Scan to SMB" is executed by the function execution unit 100.

Before the function execution unit 100 starts communication session for transmitting data to the target communication device 3, in order to execute "Scan to SMB", the communication target information acquisition unit 101 acquires information for recognizing the type, from the target communication device 3. The communication target information acquisition unit 101 stores the acquired information as communication target information 111, in the memory 11. The communication target information 111 is acquired by using SNMP, Bonjour, WSD, SMB communication, and the like.

The communication-target change detection unit 102 refers to the communication target information 111 which has been acquired by the communication target information acquisition unit 101, and detects a change in a case where the communication device is changed from the previous target communication device. The communication-target change detection unit 102 records whether or not the change is performed, in the communication target information 111.

The communication-target type determination unit 103 refers to communication target type information 112, and determines the type of a communication target of the target communication device 3 from information which is obtained by transmission and reception of a previously-prepared communication protocol by the communication target information acquisition unit 101. The communication target type information 112 is information obtained by associating the type of the communication target with the information which is obtained by transmission and reception of the previously-prepared communication protocol.

The setting verification unit 104 refers to setting information 113, and determines setting (profile) recommended in communication with the target communication device 3, from the type of the communication target of the target communication device 3, which is determined by the communication-target type determination unit 103. The setting information 113 is obtained by associating the type of a previously-prepared communication target, and a setting value required in communication with a target communication device having the type of the communication target. The setting verification unit 104 verifies the determined setting. A verification method will be described in detail in the following operation.

In a case where attempt of communication with the target communication device 3 succeeds by the setting which is determined by the setting verification unit 104, the setting application unit 105 applies the determined setting as setting used in a case where the function execution unit 100 causes the function unit 15 to execute the function.

In a case where attempt of communication with the target communication device 3 fails by the setting which is determined by the setting verification unit 104, the error notification unit 106 notifies the administrator terminal 2 of an error.

The memory 11 stores the communication program 110 for operating the processor 10 as the above-described units 100 to 106, the communication target information 111, the communication target type information 112, the setting information 113, and the like.

(Operation of Communication Device)

Next, an action of the exemplary embodiment will be described.

Firstly, if the user interface 14 receives an operation, the function execution unit 100 causes the function unit 15 to execute "Scan to SMB". However, before the function execution unit 100 starts communication session for transmitting data to the target communication device 3, in order to execute "Scan to SMB", the communication target information acquisition unit 101 acquires information for recognizing the type as illustrated in the following FIG. 3, from the target communication device 3. Then, the communication target information acquisition unit 101 stores the acquired information as the communication target information 111, in the memory 11.

Figure 3:
FIG. 3 is a table illustrating a specific example of a configuration of communication target information.

FIG. 3 is a table illustrating a specific example of a configuration of the communication target information 111.

The communication target information 111 includes fields of FQDN, a server type, and a change detection status. In the field of FQDN, FQDN or an IP address of the target communication device 3 is described. In the field of a server type, the type of a server is described as an example of the type. In the field of a change detection status, whether or not the server detects a change based on comparison to a time of previous communication is described.

As an example of the server type, an operating system (OS) is described. However, the server type may be Server Deamon, a protocol version, or the like.

It is assumed that the type of the target communication device 3 is recognized by the communication target information acquisition unit 101 based on a character string of System Description, which is obtained by the SNMP Protocol. In a case of "FUJI XEROX ApeosPort-IV C3370", a character string which can specify a firmware version of the target communication device 3, which is referred to as "ESS1.2.18, IOT 41.3.0, FIN C32.54.0, IIT 2.21.2" is obtained.

It is assumed that the communication target information acquisition unit 101 performs recognition based on a response message which is obtained in the HTTP Protocol, or on a character string of an META tag. In a case of "WWW-Authenticate", a response message which can specify a product series name of the target communication device 3, which is referred to as "Basic realm="CentraWare InternetServices"" is obtained.

It is assumed that the communication target information acquisition unit 101 performs recognition based on a Description character string which is obtained in the SMB Protocol. In a case of "Native LAN Administrator", a character string which can specify a server function module of the target communication device 3, which is referred to as "Samba 2.2.8a-ja-1.1" is obtained.

It is assumed that the communication target information acquisition unit 101 performs recognition based on a vendor address of an MAC address which is obtained in the NetBIOS Protocol. In a case of "Fuji Xerox", a vendor of the target communication device 3 is recognized from an MAC address which is referred to as "08:00:37:*:*:*".

Then, the communication-target change detection unit 102 refers to the communication target information 111 illustrated in FIG. 3, and detects a change in a case where the server type is changed, based on a time of the previous communication. The communication-target change detection unit 102 records "change occurs" in the communication target information 111.

Then, the communication-target type determination unit 103 refers to the communication target type information 112 which is information obtained by associating the type of the communication target with the Information which is obtained by transmission and reception of a previously-prepared communication protocol, and determines the type of the communication target of the target communication device 3 from the information which is obtained by transmission and reception of the communication protocol by the communication target information acquisition unit 101.

Figure 4:
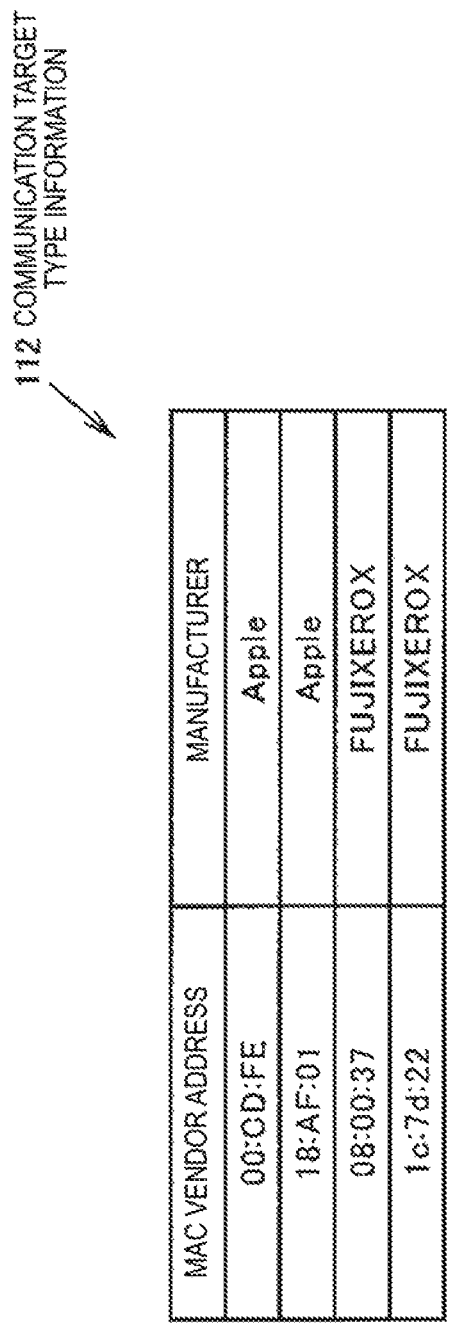
FIG. 4 is a table illustrating a specific example of a configuration of communication target type information.

FIG. 4 is a table illustrating a specific example of a configuration of the communication target type information 112.

The communication target type information 112 is an example of information obtained by transmission and reception of a communication protocol. The communication target type information 112 includes an MAC vendor address and a manufacturer. The MAC vendor address is an MAC address which is acquired by the SMB NetBIOS communication, and is determined for each vendor. The manufacturer indicates the name of the vendor as an example of the type of the communication target.

The communication-target type determination unit 103 determines the manufacturer of the target communication device 3 to be "Apple", for example, in a case where an MAC address of "00:CD:FE" is acquired.

The information such as the MAC vendor address, which is obtained by transmission and reception of a communication protocol, has a value which is arbitrarily determined by the manufacturer, and may be set to a new value. Thus, the communication target type information 112 may be stored in an external server, and the communication device 1 may refer to the stored information. In this case, the external server normally updates the information, and thus it is possible to correspond to a new value which is determined for a new product.

Then, the setting verification unit 104 refers to the setting information 113 obtained by associating the type (manufacturer) of a previously-prepared communication target with a setting value required in communication with a target communication device having the type (manufacturer) of the communication target, and determines setting (profile) recommended in communication with the target communication device 3, from the type (manufacturer) of the communication target of the target communication device 3, which is determined by the communication-target type determination unit 103.

FIG. 5 is a table illustrating a specific example of a configuration of the setting information 113.

The setting information 113 includes a manufacturer and a profile. The profile is a setting value required in communication with the manufacturer.

Since the communication-target type determination unit 103 determines the manufacturer of the target communication device 3 to be "Apple", the setting verification unit 104 determines the profile to be SJIS (Mac OS specifications).

Then, the setting verification unit 104 verifies the determined setting. The verification is performed through procedures which will be described below and are illustrated in FIGS. 6A and 6B.

Figure 6A:
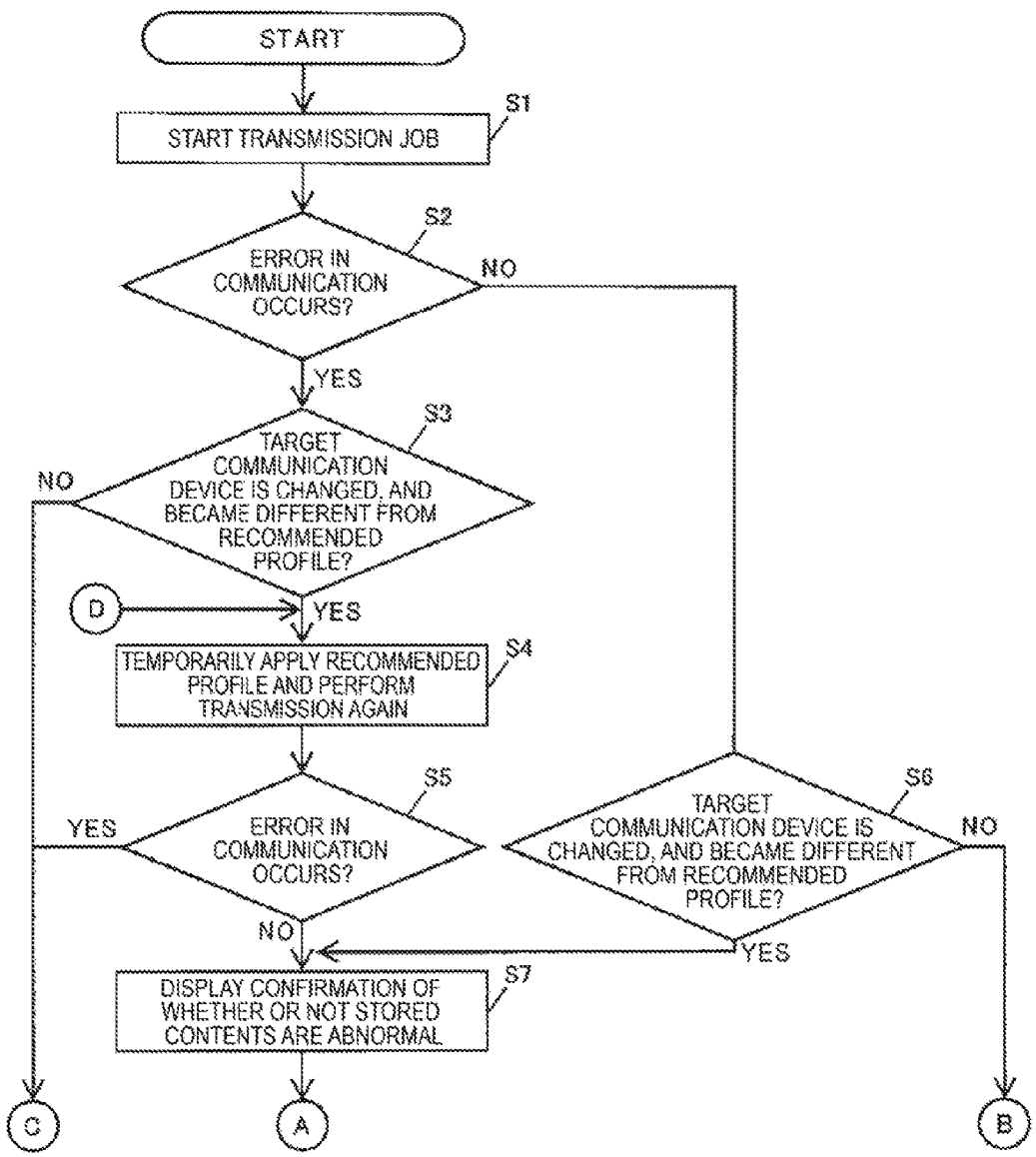
FIG. 6A is a flowchart illustrating an example of an operation of the communication device.
Figure 6B:
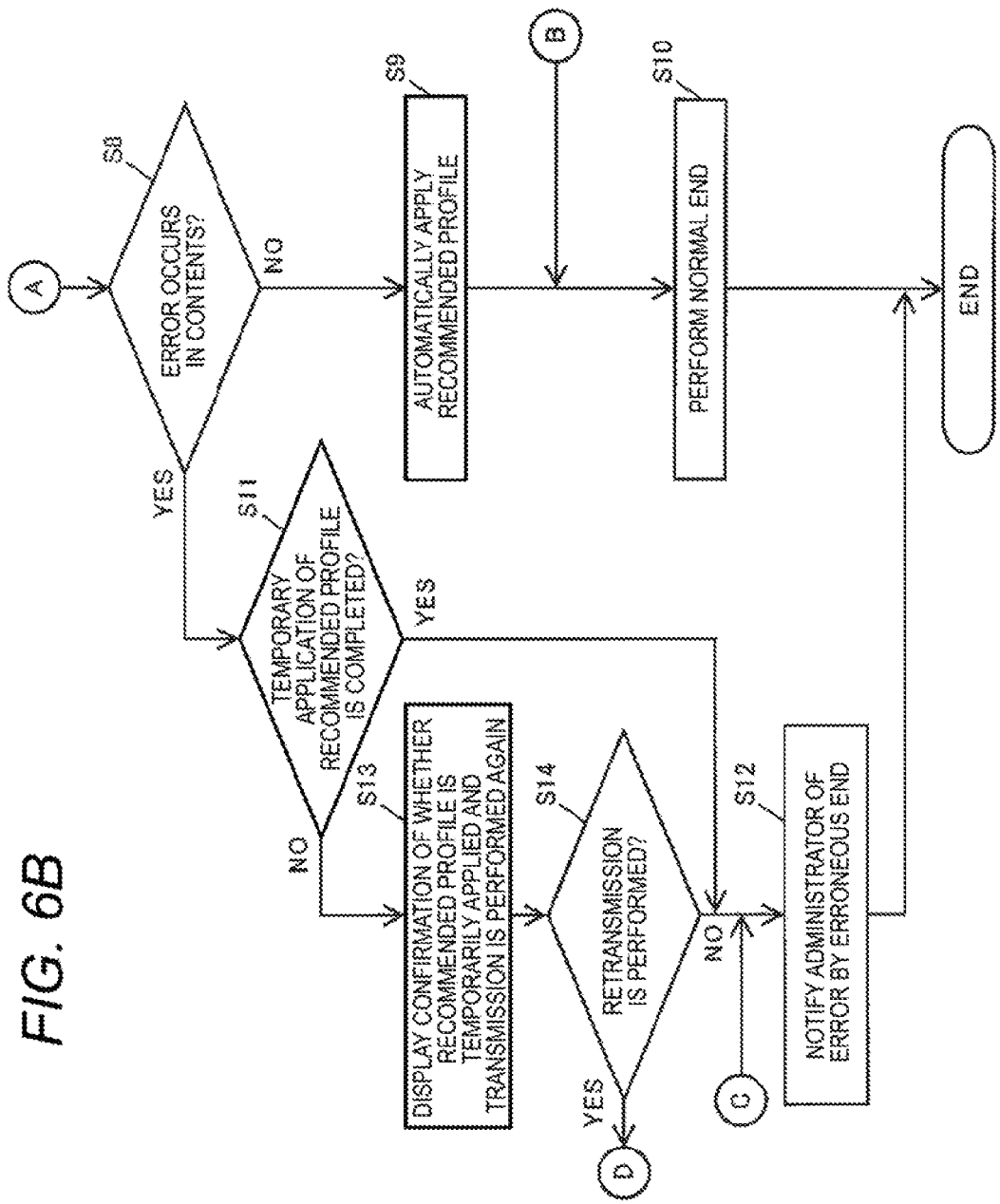
FIG. 6B is a flowchart illustrating an example of the operation of the communication device.

FIGS. 6A and 8B are flowcharts illustrating an example of an operation of the communication device 1.

Firstly, the setting verification unit 104 operates the function unit 15 from the function execution unit 100, so as to execute a transmission job (S1).

Then, in a case (S2; Yes) where an error in communication occurs in executing the transmission job, and in a case (S3; Yes) where the communication-target change detection unit 102 records "change occurs" in the communication target information 111, and the recommended profile has a difference from the previous profiles, the setting verification unit 104 temporarily applies the recommended profile. The setting verification unit 104 operates the function unit 15 from the function execution unit 100, so as to execute the transmission job again (S4).

Then, in a case (S5; No) where an error in communication does not occur in performing the transmission job again, the setting verification unit 104 displays confirmation of whether or not abnormality such as character corruption or layout breaking occurs in contents which are generated by the communication device 1 and are stored in the target communication device 3 by the transmission job, in the display 13 (S7), and causes a user to perform the confirmation.

Then, in a case (S8; No) where the user operates the user interface so as to indicate a message indicating that there is no abnormality in the contents, as input details, in the setting verification unit 104, the setting application unit 105 applies the setting which is temporarily applied, as setting used in a case where the function execution unit 100 causes the function unit 15 to execute the function (S9). The setting application unit 105 normally ends "Scan to SMB" (S10).

In a case (S8; Yes) where the setting verification unit 104 verifies that abnormality occurs in the contents, and in a case (S11; Yes) where the recommended profile is completed to be temporarily applied in Step S4, "Scan to SMB" is abnormally ended. Thus, the error notification unit 106 notifies the administrator terminal 2 of an error (S12).

In a case (S2; No) where an error in communication does not occur in performing the transmission job, in Step S2, and in a case (S6; Yes) where the communication-target change detection unit 102 records "change occurs" in the communication target information 111 and the recommended profile has a difference from the previous profiles, the setting verification unit 104 similarly performs the processes of Steps S7, S8, S9, S10, and S11.

Since the case (S11; No) where the recommended profile is not completed to be temporarily applied in Step S4 occurs in Step S11, the recommended profile is temporarily applied and confirmation of whether the transmission job is performed again is displayed in the display 13 (S13). In a case (S14; Yes) where the user operates the user interface and a message of performing again is displayed as input details, the process proceeds to Step S4.

In a case (S6; No) where the communication-target change detection unit 102 does not record "no change" in the communication target information 111 or the recommended profile does not have a difference from the previous profiles in Step S6, "Scan to SMB" is normally ended (S10).

In a case (S14; No) where a message of not performing again is displayed as the input details in Step S14, the process proceeds to Step S12. The error notification unit 106 notifies the administrator terminal 2 of an error.

In a case (S3; No) where the communication-target change detection unit 102 does not record "no change" in the communication target information 111 or the recommended profile does not have a difference from the previous profiles in Step S3, the process proceeds to Step S12. The error notification unit 106 notifies the administrator terminal 2 of an error.

In a case (S5; Yes) where an error in communication occurs in performing the transmission job again, in Step S5, the process also proceeds to Step S12. The error notification unit 106 also notifies the administrator terminal 2 of an error.

Advantages of Exemplary Embodiment

According to the above-described exemplary embodiment, the type of the device is determined based on the information obtained by communication with the target communication device 3, and setting which is predetermined for each type is temporarily applied so as to verify the setting. Thus, even in a case where the type of the target communication device 3 is changed, and even in a case where the communication setting for communicating with the device is not predetermined, it is possible to attempt to change the communication setting so as to enable correspondence with the target communication device 3.

Since a form in which a user is caused to confirm whether an error does not occur in the contents is made, it is possible to perform verification in a contents level, in addition to a communication protocol level.

Other Exemplary Embodiment

The present invention is not limited to the aforementioned exemplary embodiment, and various modifications can be made in a range without departing from the gist of the present invention.

The functions of the units 100 to 106 of the processor 10 are realized by a program in the aforementioned exemplary embodiment. However, all or some of the units may be realized by hardware such as ASIC. The program used in the aforementioned exemplary embodiment may be stored in a recording medium such as a CD-ROM and be provided. The steps described in the aforementioned exemplary embodiment may be replaced, deleted, and added in the range without changing the gist of the present invention.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a communication program for causing a computer to execute a process for performing a function, the process comprising:
   verifying, when detected that a type of a target communication device is changed, setting details which are previously prepared, by temporarily changing setting of a communication protocol based on the setting details which are previously prepared for the type of the target communication device and communicating with the target communication device using the changed setting of the communication protocol based on the setting details which are previously prepared; and
   applying the changed setting of the communication protocol when verified that no communication error is detected during the verification.

2. The non-transitory computer readable medium according to claim 1,
   wherein the process further comprises:
   performing error notification when verified that a communication error is detected during the verification.

3. The non-transitory computer readable medium according to claim 1,
   wherein in verifying the setting details, further verifying whether or not an error occurs in contents generated through communication, and
   wherein in applying the changed setting, further applying the changed setting of the communication protocol when verified that no error is detected in the contents during the verification.

4. The non-transitory computer readable medium according to claim 3,
   wherein the process further comprises:
   performing error notification when verified that a communication error is detected or the error is detected in the contents during the verification.

5. A communication device comprising:
   a verification unit that verifies, when detected that a type of a target communication device is changed, setting details which are previously prepared, by temporarily changing setting of a communication protocol based on the setting details which are previously prepared for the type of the target communication device and communicating with the target communication device using the changed setting of the communication protocol based on the setting details which are previously prepared; and
   an application unit that applies the changed setting of the communication protocol when verified that no communication error is detected by the verification unit.

* * * * *